United States Patent
Rose et al.

(10) Patent No.: US 6,996,825 B2
(45) Date of Patent: Feb. 7, 2006

(54) METHOD AND APPARATUS FOR EFFICIENT OBJECT SUB-TYPING

(75) Inventors: John R. Rose, San Jose, CA (US); Clifford N. Click, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 760 days.

(21) Appl. No.: 10/033,582

(22) Filed: Dec. 27, 2001

(65) Prior Publication Data

US 2003/0126305 A1 Jul. 3, 2003

(51) Int. Cl.
G06F 9/44 (2006.01)
(52) U.S. Cl. ..................................................... 719/315
(58) Field of Classification Search ................ 719/315, 719/316, 310; 717/114, 116; 707/103
See application file for complete search history.

(56) References Cited

U.S. PATENT DOCUMENTS

| | | | | |
|---|---|---|---|---|
| 5,267,349 A | * | 11/1993 | Barabash et al. ............. | 706/53 |
| 5,291,593 A | * | 3/1994 | Abraham et al. ........ | 707/103 R |
| 5,692,183 A | * | 11/1997 | Hapner et al. .......... | 707/103 R |
| 5,793,965 A | * | 8/1998 | Vanderbilt et al. .......... | 709/203 |
| 5,905,987 A | * | 5/1999 | Shutt et al. ............. | 707/103 R |
| 5,995,972 A | * | 11/1999 | Allgeier ................... | 707/103 R |
| 6,142,684 A | * | 11/2000 | Kirshenbaum et al. ..... | 717/143 |
| 6,182,083 B1 | * | 1/2001 | Scheifler et al. ......... | 707/103 R |
| 6,260,045 B1 | * | 7/2001 | Eidt ........................ | 707/103 R |
| 6,389,425 B1 | * | 5/2002 | DeMichiel et al. ......... | 707/102 |
| 6,714,991 B1 | * | 3/2004 | Bak et al. .................... | 719/316 |
| 2003/0061230 A1 | * | 3/2003 | Li ........................... | 707/103 R |
| 2003/0188295 A1 | * | 10/2003 | Adl-Tabatabai et al. .... | 717/126 |

FOREIGN PATENT DOCUMENTS

EP     0945790 A2 *  9/1999

OTHER PUBLICATIONS

C. Click et al, "Fast Subtype Checking in the HotSpot JVM", ACM, Nov. 2002, pp. 96-103.*
D. Bacon, et al "Fast Static Analysis of C++ Virtual Function Calls", ACM, 1996, pp. 324-341.*
N. Cohen, "Type-Extension Type Tests Can Be Performed In Constant Time", ACM, 1991, pp. 626-629.*

* cited by examiner

*Primary Examiner*—Sue Lao
(74) *Attorney, Agent, or Firm*—Beyer Weaver & Thomas, LLP

(57) ABSTRACT

An efficient method of sub-typing an object in an object oriented computing environment is provided. In one embodiment, the sub-typing method loads an input object having an object type, whereby an embedded array and a cache are searched for an object sub-typing data structure corresponding to the requested supertype. Any found object sub-typing data structures are associated with the input object. In some embodiments, if the object sub-typing data structure is not initially found, an overflow array is searched and the cache is updated with the object sub-typing data structure when the object sub-typing data structure is included in the overflow array. A system and software product is further provided in other embodiments whereby information associated with a particular object sub-type is obtained.

49 Claims, 5 Drawing Sheets

METHOD AND APPARATUS FOR EFFICIENT OBJECT SUB-TYPING

FIELD OF THE INVENTION

The present invention relates generally to computer systems. More specifically, the invention relates to run-time methods for efficient object sub-typing in object oriented programming languages.

BACKGROUND OF THE INVENTION

Many modern programming language systems, such as Java and C++, are based on object oriented programming. Object oriented programming languages tend to be more flexible and robust because many data types are grouped into generic object classes. Generic object classes are defined so that object instances can share models and reuse the class definitions in their code. Each instantiation of an object class is a subclass, or subtype, with corresponding procedures and data variables that enable processing of the instantiated object. The instantiated object is what actually runs in the computer.

There are two distinct phases in the processing of a computer program by a computer, compile-time and run-time. Compile-time is the initial step of translating programming source code into executable code, which includes both computer instructions and their associated supporting data structures. In contrast, run-time is the final step where the executable code is executed to perform its intended function, such as creating, classifying, and manipulating object instances. Compile-time and run-time are often concurrently active in a modern computing system. For example, run-time execution might initiate compilation activity, or the compiler might make use of data structures created by run-time activities.

Source code often references objects as generic classes. This allows the source code to operate correctly on any object instance that conforms to the generic class. Sometimes, however, object classes are hierarchically organized into a sub-typing array, which is typically a decision tree structure with the generic classes branching under a single object class at the tree's root and multiple levels of object subtypes branching from each parent object class above. This tree structure is often called the "class hierarchy". Source code may request that an object be tested as to whether it is a subtype of some particular class being sought by the programmer. Such tests are called subtyping tests. If an object passes a subtyping test, the source code which controls subsequent program execution may treat the object as an instance of the sought class, using in conjunction with the original object the sought class's associated procedures and data variables. Subtyping tests are common in many object-oriented applications, and may occur millions of times per second.

Subtyping tests are compiled into executable codes called supertype requests, which search for the desired supertype in the given object's data structures. The executable code of a class includes information to help determine subtyping relationships. In a statically compiled language like C++ this information is directly emitted by the static compiler. The current state of the art in Java, for example, is for the runtime system to store an array or list of supertypes, sometimes referred to a supertyping array, is associated with the class data structure of each class, at the time it is loaded into an application. It should be appreciated that supertyping arrays are created for the compiler's benefit, and usually are created concurrently with the running, or run-time, of the application. Supertyping arrays usually are relatively large because they contain all available object supertype classes. Accordingly, they are not embedded into the class data structures of the executing code, and require the additional loading of a pointer to be searched. Searching the supertyping array is generally a relatively slow process. In current systems, run-time object subtype checks that search the supertyping array are called millions of times per second. Thus, searching the supertyping array for object subtyping presents a significant time penalty.

Certain object types such as data arrays and interfaces are special as they have special subtyping rules, as dictated by the source language. For example, in Java, a data array can be a single or multi-dimensional data structure, whose supertypes are determined in a complex manner from the supertypes of its array element type. An interface is property that holds true over some collection of object classes that are not related to the parent-subtype tree relationship of the class hierarchy. This lack of object interface structure may force each object type in a large tree to be tested for implementation of a particular interface type, as opposed to simply searching up the tree to a generic interface class.

Thus, what is required is a more efficient run-time object subtype test that avoids unnecessarily searching large class hierarchies.

SUMMARY OF THE INVENTION

To achieve the foregoing and other objects and in accordance with the purpose of the present invention, an efficient method of sub-typing an object in an object oriented computing environment is provided.

In one embodiment, the sub-typing method loads an input object having an object type, and an embedded supertype array and a supertype cache are concurrently searched for an object sub-typing data structure corresponding to the object type being sought. Any found object sub-typing data structures are associated with the input object.

In another embodiment, if the object sub-typing data structure is not initially found, an overflow array is searched and the cache is updated with the object sub-typing data structure when the object sub-typing data structure is included in the overflow array. In some cases, however, only the cache is searched for the object sub-typing data structure corresponding to the object type being sought, and if not found, the overflow array is searched for a corresponding object sub-typing data structure.

In yet another embodiment, an apparatus arranged to sub-type an object in an object oriented computing environment is described. The apparatus includes a means for searching an embedded array and a cache for an object sub-typing data structure corresponding to the object type being sought. If the object sub-typing data structure is found, then a means for associating the found object sub-typing data structure to the input object is provided, otherwise, a means is provided for searching the overflow array for an object sub-typing data structure corresponding to the input object type, whereby the contents of the cache are updated based on object sub-typing data structure(s) found in the overflow array search.

In another aspect of the present invention, an object sub-typing system is provided that receives an input object having an object type, and is configured with an object type locator unit to search an embedded array and a cache for the object type being sought, where the object locator unit can also modify the contents of the cache. In other embodiments, the system is further configured with an overflow array containing a set of object sub-typing data structures, the overflow array being arranged to be searched by the object type locator unit.

In another aspect of the invention, an object sub-typing system is arranged to operate more efficiently by restricting the depth of the class decision tree to a preset limit. This allows the embedded supertype array to have a fixed length, and removes the need for length checking at ran-time. Supertypes which are deeper in the decision tree than the allowed depth are included in the overflow array, so that subtype checks can still find them.

In yet another aspect of the invention, an object sub-typing system is arranged to operate more efficiently by augmenting the class decision tree with special types, such as array types, allowing subtype checks which seek these special types to execute with the same efficiency as checks which seek normal classes.

In another aspect of the invention, an object sub-typing system is arranged to operate more efficiently by configuring each requestable supertype with a location description field which guides searches for that requestable supertype at the position or positions in the embedded array, cache, or other searchable data structures in which the requested supertype may occur. If the input object type does not contain the object sub-typing data structures of the requested supertype at the position(s) indicated by the location description field, the input object type is immediately known not to match the requested supertype, and no further costly searching is necessary. In some embodiments, the location description field enables the embedded array and cache to be searched concurrently, because it indicates the position where, in the data structures within the input object type, the supertype is to be found, if it is there at all.

In another aspect of the invention, as part of the compilation of some object supertype requests, some of the present searching operations may be performed immediately by the compiler, and the results encoded directly into the instructions produced by the compiler, thereby reducing the number of operations required at runtime. In some embodiments, the location description field may be loaded from a requested supertype if it is a known constant at compile-time. Similarly, in some embodiments, an element of the embedded array or other searchable data structure may be loaded from the input object type, if it is a known constant at compile time.

In other aspects of the present invention, combinations of the foregoing methods and systems are embodied into a computer program product that obtains information associated with a particular object sub-type.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE EMBODIMENTS

The present invention will now be described in detail with reference to an embodiment thereof as illustrated in the accompanying drawings. In the following description, specific details are set forth in order to provide a better understanding of the present invention. It will be apparent, however, to one skilled in the art, that the present invention may be practiced without some or all of these specific details. In other instances, well-known steps and/or system components have not been described in detail in order to not unnecessarily obscure the present invention.

A method and apparatus for increasing the efficiency of run-time object subtype tests in object oriented programming languages is presented that improves object sub-typing efficiency by introducing an embedded object supertype array and supertype cache. These object supertype arrays hold a branch of the sub-typing decision tree, and associated data structures, that includes expected object supertypes that reduce the need to search other, possibly much larger, sub-typing data structures, sometimes referred to as an overflow array.

Figure 1:
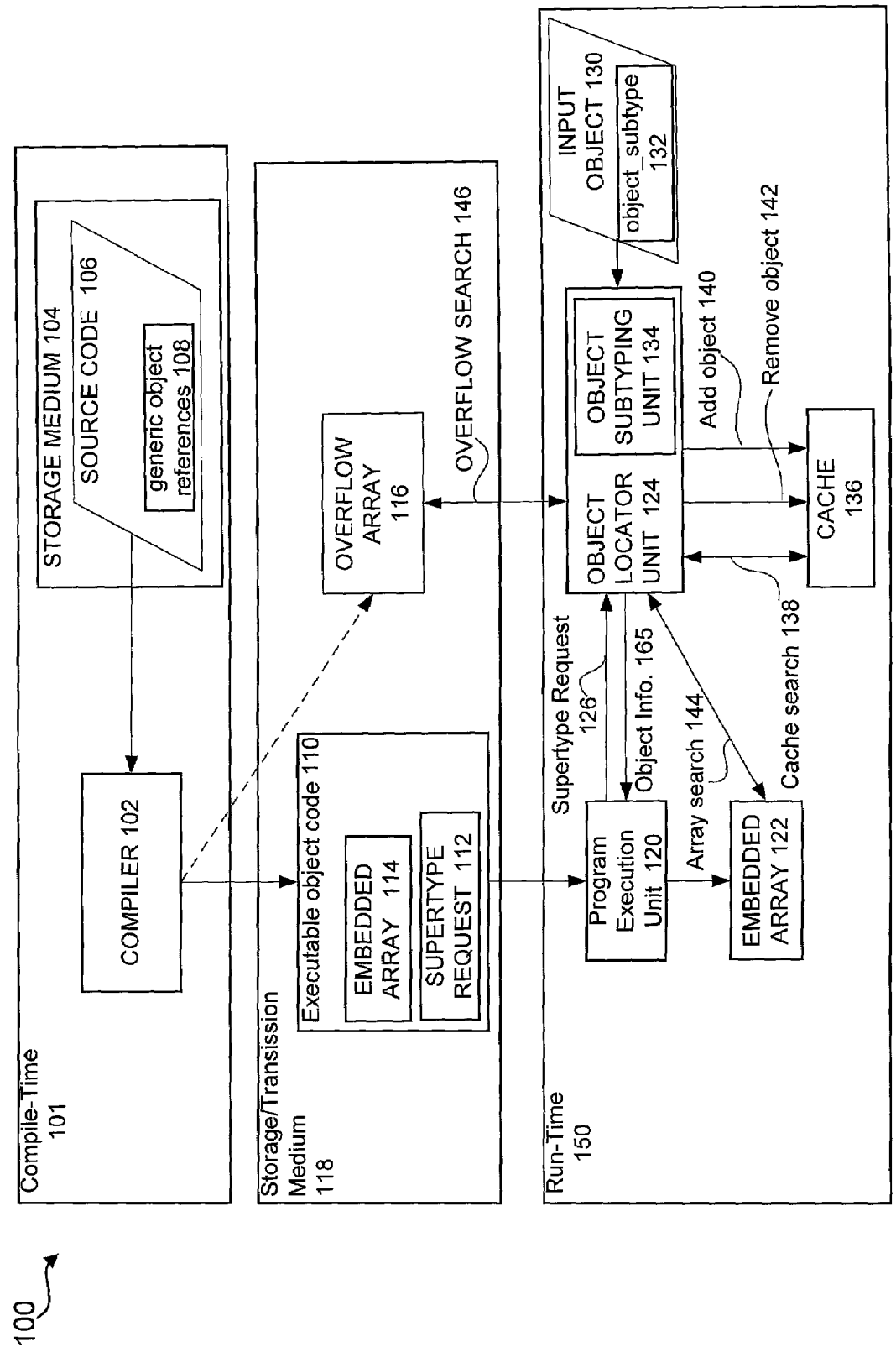
FIG. 1 is a system diagram of an embodiment of the present invention.

The invention will now be described in terms of an object oriented computing system 100 in accordance with an embodiment of the present invention as shown in FIG. 1. The system 100 includes a compiler 102 coupled to a storage device 104 that stores source code 106 having a plurality of generic object references 108 such as, for example, parent object classes. During what is referred to as compile time, compiler 102 compiles source code 106 into executable object code 110 whereas during what is referred to as run-time, the executable object code 110 executes to perform its intended function(s). It should be noted that in modern object oriented computing systems, compiler 102 is usually a just-in-time compiler, whereby compilation and execution occurs concurrently.

Also during compile-time, each subtyping test required by the source code 106 is encoded as a corresponding supertype request(s) 112 by the compiler 102 which also embeds within the executable object code 110 an object sub-typing database referred to as embedded array 114. In the described embodiment, the embedded array 114 includes a group of object sub-typing data structures (not shown) that resolves a relatively small number of generic object classes as super-types. The generic object classes that are referenced by the embedded array 114 are all those included in the class decision tree, possibly limited to be within a certain fixed distance from the root, and possibly with the inclusion of special types into the decision tree, to the extent that they can be assigned unique parent types within the tree. It should be noted that any object sub-typing data structure(s) not included in the embedded array 114 are placed in what is referred to as an overflow array 116 that can be created by any number of system components, such as, for example, the compiler 102. It should also be noted that both the executable code 110 and overflow array 116 are made available during run-time by storage or transmission media 118. Contemplated storage media include random access memory (RAM), read-only memory (ROM), optical disks, magnetic tape, and magnetic hard or floppy drives and the like, whereas transmission media include wired or wireless modes of communication, such as the Internet, intranets, streaming media, cable, telephone, and satellite communication networks, etc. In this way, data can stream to run-time components in real-time while the information is being generated during, for example, compile-time.

In the present embodiment, the object sub-typing system is arranged to operate more efficiently by restricting the depth of the class decision tree to a preset limit (such as 6). This allows the embedded supertype array to have a fixed length, and removes the need for length checking at run-time. Supertypes which are deeper in the decision tree than the allowed depth are included in the overflow array, so that subtype checks can still find them. Because the length of the supertype array is limited, it is possible to embed the array directly within class data structures, allowing faster access, in addition to removing costly size checks. It should also be noted that by embedding the supertype array directly into the class data structures associated with the executable object code, there is an opportunity to further optimize, at compile-time, the searching of the embedded supertype array by locating certain supertype data structures at locations that permit a short-offset addressing operation, instead of the more costly long-pointer addressing typically required.

It should be noted that the overflow array and cache can be realized by any searchable data structure. The embedded, cache, and overflow arrays are supertyping arrays that are created for the compiler's benefit, and are usually created concurrently with the running, or run-time, of the application. The overflow array is usually relatively large because it may contain substantially all available object supertype classes. Searching the external overflow array requires the loading of an additional pointer that is not required when the embedded array is searched. Not having to load an additional pointer can be a substantial performance benefit, as subtyping checks are performed millions of times per second. Moreover, searching the external overflow array is generally a relatively slow process, hence there is a significant benefit gained if the object being subtyped is located in a smaller supertyping array such as the embedded or cache supertyping arrays of the present invention.

During run-time, a program execution unit 120 makes the embedded array 114 available as a run-time embedded array 122 for use by an object type locator unit (OLU) 124. The program execution unit 120 also generates various supertype request(s) 126 to the OLU 124. The supertype requests 126 are the appropriate object types required by supertype request(s) 112 from the executing code. The OLU 124 receives an input object 130 from a user, for example. The input object 130 has a particular object subtype 132 associated with one or more particular supertype(s). Using an object sub-typing unit 134 the OLU 124 determines if input object 130 is a subtype of supertype request(s) 126 from the program execution unit 120. If the input object 130 is a subtype of the requested supertype 126, the OLU 124 notes the success of the request, and transmits this as object information 165 to the program execution unit 120. To find the requested supertype 126, the OLU 124 searches the embedded array 122, a cache 136, and the overflow array 116. In the described embodiment, the cache 136 holds at least some of the object sub-typing data structures that were found in previous overflow array searches for which the OLU 124 arbitrates any search of and/or modification of the cache 136. The OLU 124 initiates cache searches and receives results through cache search path 138. Possible modifications by the OLU 124 to the cache 136 include adding an object, via a signal 140 to the cache 136, and/or removing a cached object via a signal 142. The OLU 124 initiates embedded and overflow array searches and receives results through search paths 144 and 146, respectively.

Figure 2:
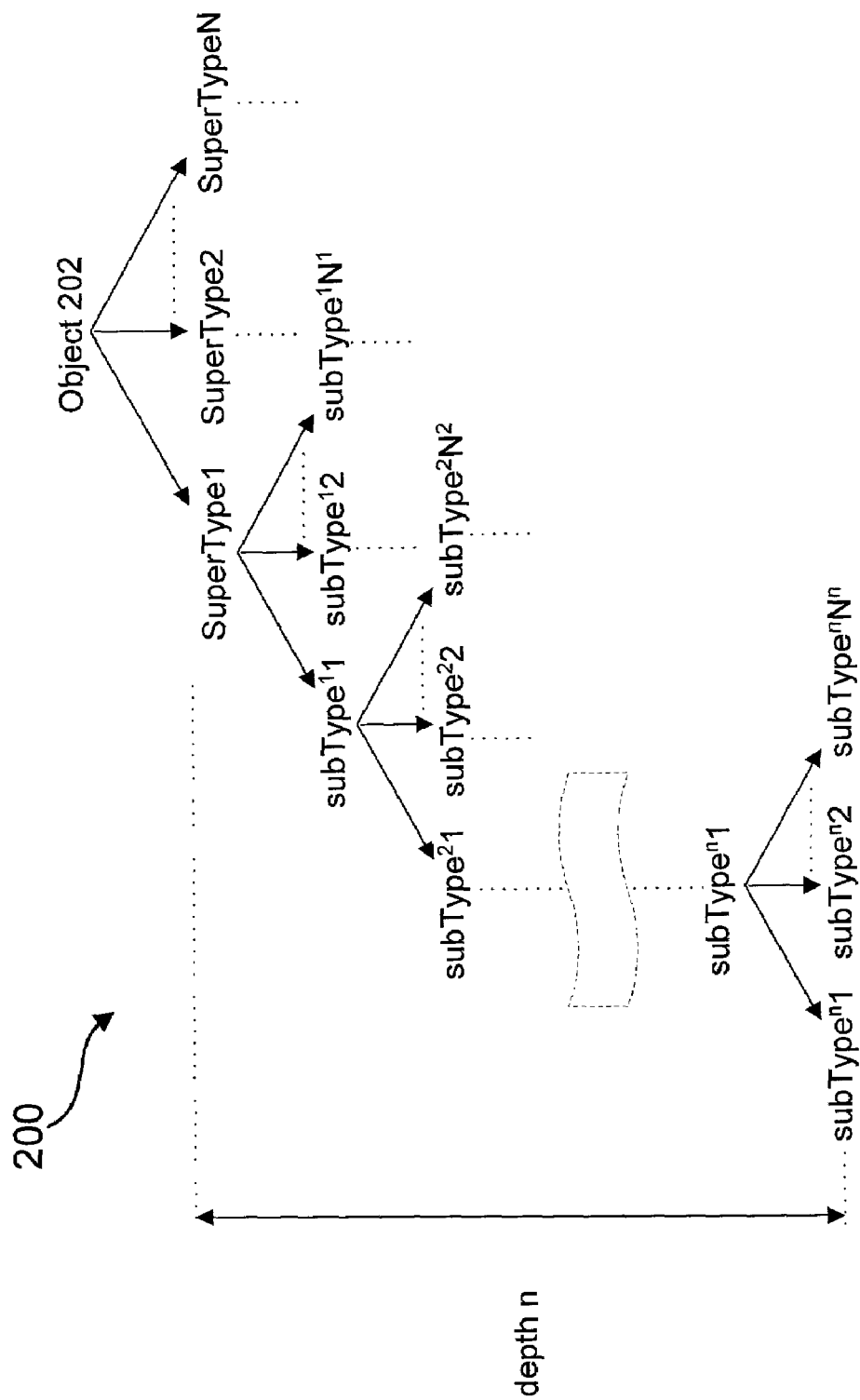
FIG. 2 illustrates an example of the object sub-typing tree structure.

FIG. 2 illustrates an example of the decision tree structure 200 used to initialize the embedded array 122, cache 136, and overflow array 116 described in FIG. 1. In the described embodiment, the decision tree 200 is a hierarchically ordered group of types and sub-types. Accordingly, the decision tree 200 includes an object class 202 associated with generic object types $type_1$ through $type_N$ (where N is the number of types represented at the corresponding node in the tree) that include, for example, strings, arrays, and images. It should be noted that for clarity, only the leftmost nodes of the decision tree 200 are expanded into their respective branches. Accordingly, each node branches into a multiplicity of subtypes such as, for example, a first level subtype of a generic image object includes JPG, GIF, or BMP, etc, which are all general image formats well known to those skilled in the art; whereas a second level of subtypes for GIF could be, for example, GIF87. This branching into lower levels can continue until all subtypes have been described, but is usually limited to a certain depth n by system constraints where the depth n of the tree 200 is the number of levels that branch into a lower level.

With reference to FIG. 1, the supertype requests 112 contained in the executable code 110 usually point to any non-terminating node in the decision tree 200. During run-time, the OLU 124 determines if the input object 130 is a subtype of the supertype requested by the program execution unit 120. Each subtype node contains, or points to, the associated methods and parameters required for processing of the input object 130.

Figure 3:
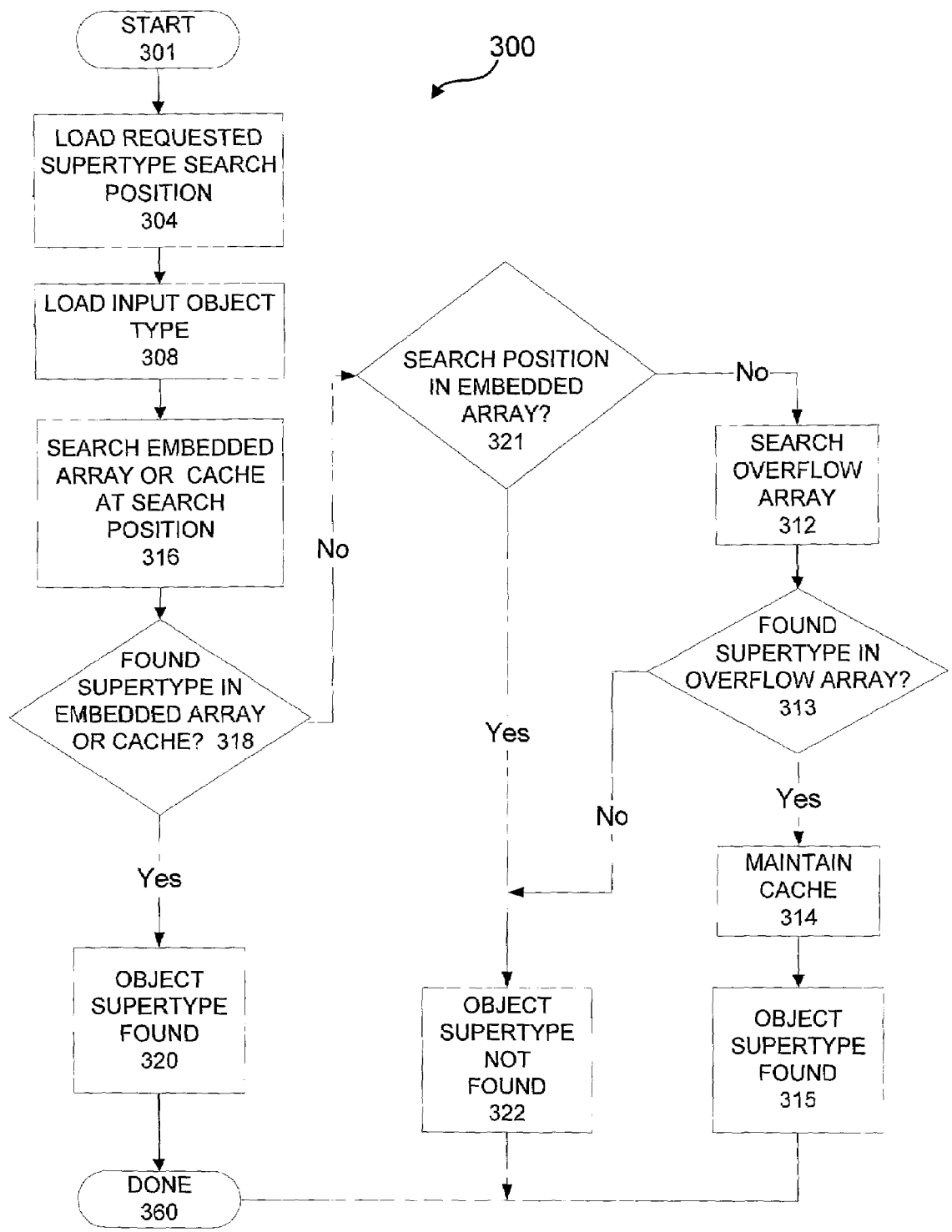
FIG. 3 is a flowchart describing an object sub-typing method according to an embodiment of the present invention.

FIG. 3 shows a flowchart detailing a process 300 for performing an object sub-typing in accordance with an embodiment of the invention. Various initialization steps (not shown) may be performed to configure the run-time environment for proper execution of process 300. In some embodiments, such initialization steps include making available, for each object subtype, the executable code, embedded array, cache. and/or overflow array to the run-time components of the run-time system. Additionally, the cache may be initially empty, or pre-filled with certain desired information. Additionally, each possible supertype is initially supplied with a description of where, within the embedded arrays of all its subtypes, its reference may be sought. Moreover, if the supertype does not fit into the decision tree because of depth limitations or other special conditions, the supplied description refers to a location in the cache, not in the embedded array. Accordingly, the process 300 begins at 304 by loading from the search position for the requested supertype that determines where to search in the embedded array or cache for the input object type. After loading the requested supertype search positions at 304, the input object type is loaded at 308. The requested supertype search positions refer to the cache exactly when the requested supertype is a special type, and therefore serves to distinguish special supertypes from normal ones. In some embodiments, the load performed at 304 may be performed before that at 308, or in parallel, or either may be performed during compilation, so that the description of where to search becomes a direct part of the machine instructions performing the search at 316. It should be appreciated that the present object sub-typing system is arranged to operate more efficiently by augmenting the class decision tree with special types, such as array types, allowing subtype checks which seek these special types to execute with the same efficiency as checks which seek normal classes.

The embedded array and/or cache are searched 316 for the requested supertype. This search is made according to the specific location description loaded at 304. By way of example, in some embodiments, to determine if the input object is a subtype of the requested supertype, the OLU starts the array search within the input object type's sub-typing data structures from the offset indicated by the requested supertype. If the offset reported by the requested supertype in this embodiment points into the embedded array, the embedded array is searched. If, however, the offset of the present example points into the cache then the cache is searched. The present searching method is performed relatively fast, as the location description loaded at 304 describes precisely where to find the requested supertype, if it can be found outside of the overflow array. After the search, a determination is made whether or not the object type was found in the cache or the embedded array (i.e., a hit) at 318. In some embodiments, the hit is a match between the input object type's supertype and an upper parent node in the decision tree. For such embodiments, after a hit, the subtype is found in nodes below the parent node in the decision tree. If a hit has occurred, then the input object type is marked as found at 320, whereby any associated sub-typing information is retrieved and processing stops normally, otherwise it must be determined if the embedded array was searched, at 321. If the embedded array was searched then the input object is marked as not a subtype at 322 and processing stops normally. Otherwise, the overflow array is searched and if the requested supertype is found at 313, the cache is maintained at 314, and marked as a subtype at 315. Otherwise, the object is marked as not a subtype at 322 and processing stops normally. In some embodiments, however, other searchable data structures (not shown) may be searched if the requested supertype is not found at 313. It should also be noted that in certain embodiments of the present process (not shown), object supertype processing information could be transmitted to the program execution unit during or before maintaining the cache.

It should be noted that there are instances where optimizations to the present method can be performed. For example, sometimes the requested supertype may be identical to the input object type, and the requested supertype does not fit in the embedded array. In some embodiments of the present invention, this case is handled in a different manner whereby the overflow array arranged to not contain the input object type, and the code that searches the overflow array additionally checks the requested supertype for equality with the input object type. This optimization results in a smaller overflow array, increased object typing performance, and overflow arrays that can be shared among multiple input object types.

In another embodiment of the present method, if the location description loaded at 304 was pointing outside the embedded array it is inferred that the cache was searched and the input object type may still be a subtype of the supertype. Thus, to find the object subtype, the OLU performs a time consuming search of the overflow array. Because in the present embodiment the overflow array has all known generic classes and subtypes, finding the input object's subtype is very likely. In yet other embodiments, the cache is maintained by the OLU to contain the substantially the most likely object sub-typing data related to the object subtypes found in the overflow array. In one embodiment of cache maintenance, all related subtype data found in previous overflow array searches are added to the cache. In other embodiments, some combination of most frequent and/or most recent overflow array search results are added to the cache. In yet other embodiments, the cache may be fixed in size, and certain object sub-typing data may have to be intelligently deleted to add new ones. The optimal method of determining the most likely overflow array object subtype to be requested is implementation dependent.

Certain types of objects may not have a generic class associated with them. In an embodiment of the present process, when no generic sub-typing data are available in the overflow array then only the unique object type is stored in the cache. By way of example, in current technology interfaces may not have a generic class and may be uniquely stored in the cache. thus avoiding potentially searching through all interfaces stored in the overflow array.

Figure 4:
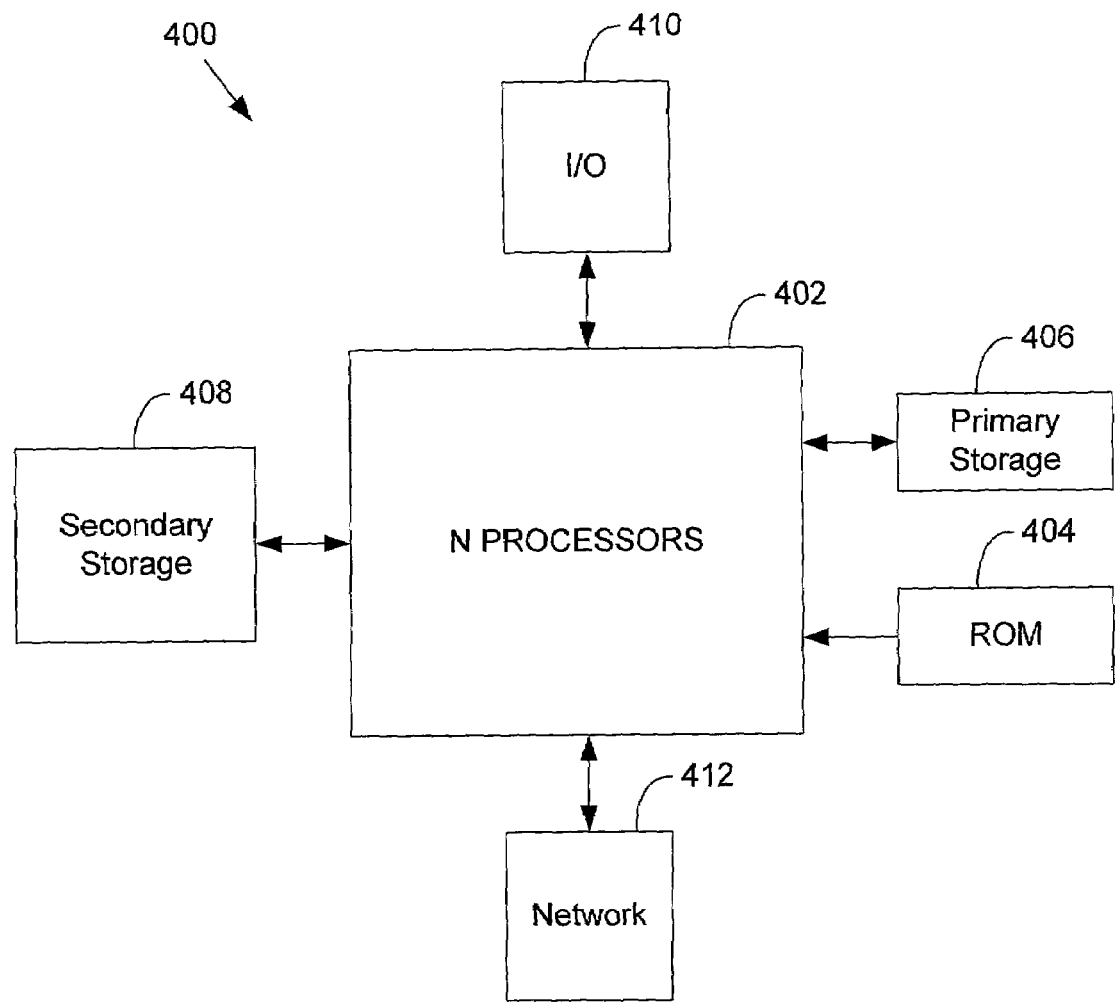
FIG. 4 is a diagrammatic representation of a general-purpose computer system suitable for implementing the present invention.

FIG. 4 illustrates a computer system 400 employed to implement the invention. As is well known in the art, ROM acts to transfer data and instructions uni-directionally to the CPUs 402, while RAM is used typically to transfer data and instructions in a bi-directional manner. CPUs 402 may generally include any number of processors. Both primary storage devices 404, 406 may include any suitable computer-readable media. A secondary storage medium 408, which is typically a mass memory device, is also coupled bi-directionally to CPUs 402 and provides additional data storage capacity. The mass memory device 408 is a computer-readable medium that may be used to store programs including computer code, data, and the like. Typically, mass memory device 408 is a storage medium such as a hard disk or a tape which generally slower than primary storage devices 404, 406. Mass memory storage device 408 may take the form of a magnetic or paper tape reader or some other well-known device. It will be appreciated that the information retained within the mass memory device 408, may, in appropriate cases, be incorporated in standard fashion as part of RAM 406 as virtual memory. A specific primary storage device 404 such as a CD-ROM may also pass data uni-directionally to the CPUs 402.

CPUs 402 are also coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 402 optionally may be coupled to a computer or telecommunications network, e.g., an Internet network or an intranet network, using a network connection as shown generally at 412. With such a network connection, it is contemplated that the CPUs 402 might receive information from the network, or might output information to the network in the course of performing the above-described method steps. Such information, which is often represented as a sequence of instructions to be executed using CPUs 402, may be received from and outputted to the network, for example, in the form of a computer data signal embodied in a carrier wave. The above-described devices and materials will be familiar to those of skill in the computer hardware and software arts.

Figure 5:
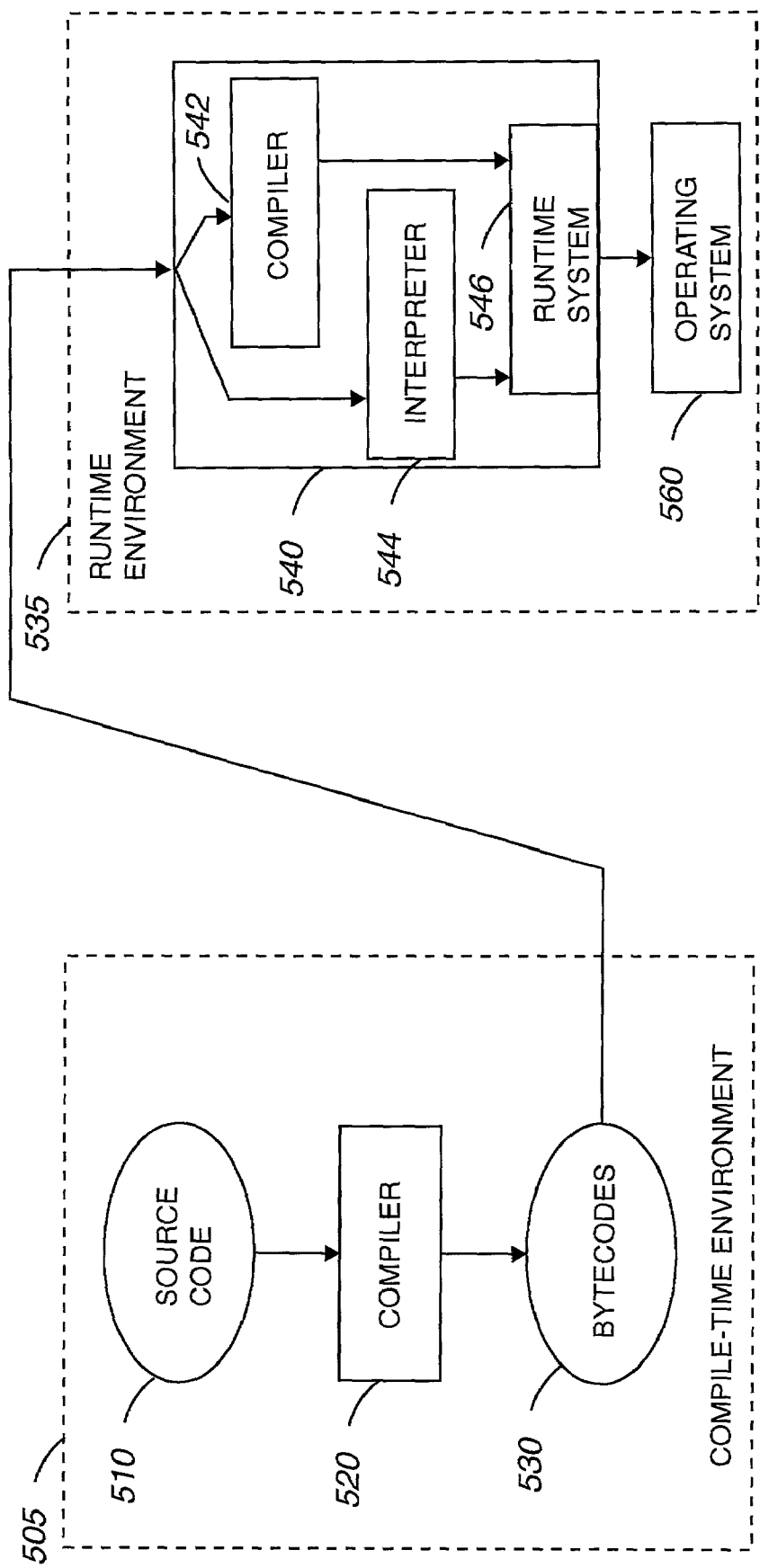
FIG. 5 is a diagrammatic representation of a virtual machine in accordance with an embodiment of the present invention.

FIG. 5 is a diagrammatic representation of a virtual machine which is supported by computer system 400 of FIG. 4, and is suitable for implementing the present invention. When a computer program, e.g., a computer program written in the Java™ programming language, is executed, source code 510 is provided to a compiler 520 within compile-time environment 505. Compiler 520 translates source code 510 into bytecodes 530. In general, source code 510 is translated into bytecodes 530 at the time source code 510 is created by a software developer.

Bytecodes 530 may generally be reproduced, downloaded, or otherwise distributed through a network, e.g., network interface 412 of FIG. 4, or stored on a storage device such as storage devices 406, or 408 of FIG. 4. In the described embodiment, bytecodes 530 are platform independent. That is, bytecodes 530 may be executed on substantially any computer system that is running on a suitable virtual machine 540.

Bytecodes 530 are provided to a runtime environment 535 which includes virtual machine 540. In one embodiment, the virtual machine may be a Java™ virtual machine. Runtime environment 535 may generally be executed using a processor or processors such as processor 402 of FIG. 4. Virtual machine 540 includes a compiler 542, an interpreter 544, and a runtime system 546. Bytecodes 530 may be provided either to compiler 542 or interpreter 544.

When bytecodes 530 are provided to compiler 542, methods contained in bytecodes 530 are compiled into machine instructions. In one embodiment, compiler 542 is a just-in-time compiler which delays the compilation of methods contained in bytecodes 530 until the methods are about to be executed. When bytecodes 530 are provided to interpreter 544, bytecodes 530 are read into interpreter 544 one bytecode at a time. Interpreter 544 then performs the operation defined by each bytecode as each bytecode is read into interpreter 544. That is, interpreter 544 "interprets" bytecodes 530, as will be appreciated by those skilled in the art. In general, interpreter 544 processes bytecodes 530 and performs operations associated with bytecodes 530 substantially continuously.

When a method is invoked by another method, or is invoked from runtime environment 535, if the method is interpreted, runtime system 546 may obtain the method from runtime environment 535 in the form of a sequence of bytecodes 530, which may be directly executed by interpreter 544. If, on the other hand, the method which is invoked is a compiled method which has not been compiled, runtime system 546 also obtains the method from runtime environment 535 in the form of a sequence of bytecodes 530, then may go on to activate compiler 542. Compiler 542 then generates machine instructions from bytecodes 530, and the resulting machine-language instructions may be executed directly by processor 402 of FIG. 4. In general, the machine-language instructions are discarded when virtual machine 540 terminates. The operation of virtual machines or, more particularly, Java™ virtual machines, is described in more detail in The Java™ Virtual Machine Specification by Tim Lindholm and Frank Yellin (ISBN 0-201-63452-X), which is incorporated herein by reference.

Java classes (and interfaces) are dynamically loaded, linked and initialized. Loading is the process of the system finding the binary form of the class (e.g., the class file) and constructing from the binary form a Class object to represent the class. The Class class is a class for storing or representing the structures of classes. Linking is the process of taking a binary form of the class and combining it into the runtime state of the system so that it may be executed. Initialization of a class includes executing the class' static initializers and initializers for static fields declared in the class.

Each Java class has a constant pool associated with it. The constant pool is stored in the Java class file and serves a function similar to symbol tables. Typically, each entry in the constant pool is indexed by a number starting with one and ending with the number of entries in the constant pool. A method for a class accesses entries in the constant pool by the index and a method for one class may not access a constant pool for another class.

In addition to the constant pool storing literal constants, the constant pool stores classes, methods, fields, and interfaces symbolically. By storing these entries symbolically it is meant that the name identifying the entry is stored, not the physical address. In other words, if a class A has a field F, both the names of A and F (along with a type signature for F) may be stored in the constant pool. By storing names and not address, the Java runtime system resolves the symbolic reference into a physical address dynamically at runtime.

While this invention has been described in terms of several embodiments, there are alterations, modifications, permutations, and substitute equivalents, which fall within the scope of this invention. It should also be noted that there are many alternative ways of implementing the methods and apparatuses of the present invention. For example, in the system embodiment shown, the executable code and overflow-array were contained in the same storage or transmission medium. However, in other embodiments they could be separately located or transmitted to run-time system components. Similarly, any combination of run-time or compile-time system or data components could be located remotely and interact over system data busses or data communication networks. By way of example, the OLU and the cache may be located outside of the same hardware or software system and interact remotely with the program execution unit, and its data components. In addition, in the system embodiment shown, the embedded array was contained in the executable code. However, in other embodiments the embedded array is located external to the executable code and made available to run-time components without changing run-time behavior. Additionally, while the method embodiment shown indicated a specific sequence of searching the embedded, cache, and overflow arrays, the particular implementation may require a multiplicity of different searching methods or sequences, but are contemplated to be within the scope of the present invention.

It is therefore intended that the following appended claims be interpreted as including all such alterations, permutations, and substitute equivalents as fall within the true spirit and scope of the present invention.

What is claimed is:

1. In an object oriented computing environment, a method of sub-typing an object performed on a computer having an embedded array and a cache, comprising:
    (a) loading an input object having an object type;
    (b) concurrently searching the embedded array and the cache for an object sub-typing data structure corresponding to a requested supertype or the input object type;
    (c) associating the object sub-typing data structure to the input object, if the object sub-typing data structure is not found;
    (f) searching an overflow array;
    (g) updating the cache with the object sub-typing data structure when the object sub-typing data structure is included in the overflow array; and, wherein the searching of the embedded array and cache begins from a location indicated by the requested supertype.

2. The method as recited in claim 1 wherein the searching of the embedded array is done without checking its size.

3. The method as recited in claim 1 further comprising:
    (d) at compile-time, loading a location description of a known-constant supertype; and
    (e) incorporating the result of the location description loading into instructions produced by a compiler.

4. The method as recited in claim 3 wherein the location description is applied at compile time to a known-constant input object type.

5. The method as recited in claim 4 wherein the location description corresponds to an embedded array location.

6. The method as recited in claim 4 wherein the location description corresponds to a cache location.

7. The method as recited in claim 4 wherein the location description corresponds to an overflow array location.

8. The method recited in claim 1, further comprising:
if the requested supertype is a special type,
(h) searching only the cache for the object sub-typing data structure corresponding to the input object type.

9. The method recited in claim 1, further comprising:
if the requested supertype is not a special object type,
(i) searching only the embedded array for the object sub-typing data structure corresponding to the input object type.

10. The method recited in claim 9, further comprising:
if the input object type is the special object type, comparing input object type directly against the requested supertype, and returning a match if the comparison is successful.

11. The method recited in claim 9, further comprising:
if the input object type is the special object type,
omitting the object sub-typing data structure(s) corresponding to the input object type from an overflow array associated with the input object type.

12. The method recited in claim 9, further comprising:
if the input object type is the special object type,
sharing an overflow array between at least two object types when the object type search requires the same overflow array contents.

13. The method recited in claim 1, further comprising:
forcing the object sub-typing data structure to be not-special by assigning it a location in the embedded array.

14. The method recited in claim 8, further comprising: if the object sub-typing data structure is not found in the search (h),
(j) searching the overflow array for the object sub-typing data structure.

15. The method recited in claim 14, further comprising:
updating the cache based upon the searching (j).

16. The method recited in claim 8, further comprising:
if the object sub-type is found in the searching (h), associating the object sub-typing data structure to the input object.

17. The method recited in claim 1, wherein the cache is updated by adding the object sub-typing data structure found in the searching (f).

18. The method recited in claim 1, wherein the cache is updated by deleting an object sub-typing data structure, the cache being further updated by adding the object sub-typing data structure found in the searching (f).

19. In an object oriented computing environment, an apparatus for sub-typing an object in a computer having an embedded array and a cache, comprising:
a processor for receiving an input object having an object type;
means for searching the embedded array and the cache for an object sub-typing data structure corresponding to a requested supertype or the input object type, wherein the searching of the embedded array and cache begins from a location indicated by the requested supertype;
means for associating the object sub-typing data structure to the input object;
if the input object sub-type is not found in the searching,
means for searching an overflow array for an object sub-typing data structure corresponding to the input object type; and
means for updating the cache contents based on object sub-typing data structure found in the searching.

20. An object sub-typing system included in a computer having an embedded array containing a first group of object sub-typing data structures and a cache containing a second group of object sub-typing data structures, comprising:
an object locator unit arranged to search the embedded array and cache for a requested object supertype; and
a cache modifier unit coupled to the object locator unit arranged to modify the contents of the cache, wherein any sub-typing data structures in the first group of objects in the embedded array that have a depth greater than a fixed depth are added to the cache.

21. The system recited in claim 20, further comprising:
an overflow array containing a third group of object sub-typing data structures, wherein the overflow array is arranged to be searched by the object locator unit.

22. The system recited in claim 20, further comprising:
a program execution unit coupled to the object locator unit, wherein the connection is configured to enable the program execution unit to request object types and receive object-handling information from the object locator unit.

23. The system recited in claim 22, wherein the embedded array is contained within an object type data structure associated with a computer program being executed by the program execution unit.

24. The system recited in claim 20, wherein the first group of object sub-typing data structures and the second group of object sub-typing data structures are mutually exclusive.

25. The system recited in claim 20, wherein the second group of object sub-typing data structures is selected from the third group of object sub-typing data structures.

26. The system recited in claim 20, wherein the cache is initialized to contain only object sub-typing data structures of a special type.

27. The system recited in claim 20, wherein the second group of object sub-typing data structures in the cache are the object sub-typing data structures substantially expected to be searched for by the object locator unit.

28. The system recited in claim 20, wherein the first group of object sub-typing data structures in the embedded array has a hierarchical data structure, wherein the hierarchical data structure has a fixed depth.

29. A computer program product for obtaining information associated with a particular object sub-type, the computer program product comprising:
computer code that determines the object type of an input object;
computer code that searches a cache and an embedded array for an object sub-typing data structure corresponding to a requested supertype or the input object type wherein the searching of the embedded array and cache begins from a location indicated by the requested supertype;
computer code that retrieves and makes available information associated with the found object sub-typing data structure;
computer code that searches an overflow array if the sub-typing data structure corresponding to the input object type is not found in the embedded array and cache;

computer code that updates the cache contents based on object sub-typing data structure(s) found in the overflow array search; and a computer-readable storage medium that stores the computer code.

30. A computer program product according to claim 29 wherein the computer-readable medium is one selected from the group consisting of a CD-ROM, a hard disk, a floppy disk, a tape drive, and semiconductor memory.

31. In an object oriented computing environment, computer program product for efficiently sub-typing an object executed on a computer having an embedded array and a cache, comprising:

computer code for loading an input object having an object type;

computer code for concurrently searching an the embedded array and the cache for an object sub-typing data structure corresponding to a requested supertype or the input object type wherein the searching of the embedded array and cache begins from a location indicated by the requested supertype;

computer code for associating the object sub-typing data structure to the input object, if the object sub-typing data structure is not found, computer code for searching an overflow array;

computer code for updating the cache with the object sub-typing data structure when the object sub-typing data structure is included in the overflow array; and computer readable storage medium for storing the computer code.

32. Computer program product as recited in claim 31 wherein the searching of the embedded array is done without checking its size.

33. Computer program product as recited in claim 31 wherein the searching of the embedded array and cache begins from a location indicated by the requested supertype.

34. Computer program product as recited in claim 31 further comprising:

computer code for loading a location description of a known-constant supertype at compile-time; and computer code for incorporating the result of the location description loading into instructions produced by a compiler.

35. Computer program product as recited in claim 34 wherein the location description is applied at compile time to a known-constant input object type.

36. Computer program product as recited in claim 35 wherein the location description corresponds to an embedded array location.

37. Computer program product as recited in claim 36 wherein the location description corresponds to a cache location.

38. Computer program product as recited in claim 36 wherein the location description corresponds to an overflow array location.

39. Computer program product recited in claim 31, further comprising:

computer code for searching only the cache for the object sub-typing data structure corresponding to the input object type if the requested supertype is a special type.

40. Computer program product recited in claim 31, further comprising:

computer code for searching only the embedded array for the object sub-typing data structure corresponding to the input object type if the requested supertype is not a special object type.

41. Computer program product recited in claim 40, further comprising:

computer code for comparing input object type directly against the requested supertype, and returning a match if the comparison is successful if the input object type is the special object type.

42. Computer program product recited in claim 40, further comprising:

computer code for omitting the object sub-typing data structure(s) corresponding to the input object type from an overflow array associated with the input object type if the input object type is the special object type.

43. Computer program product recited in claim 40, further comprising:

computer code for sharing an overflow array between at least two object types when the object type search requires the same overflow array contents if the input object type is the special object type.

44. Computer program product recited in claim 31, further comprising:

computer code for forcing the object sub-typing data structure to be not-special by assigning it a location in the embedded array.

45. Computer program product recited in claim 41, further comprising:

computer code for searching the overflow array for the object sub-typing data structure if the object sub-typing data structure is not found in the searching only the embedded array for the object sub-typing data structure corresponding to the input object type if the requested supertype is not a special object type.

46. Computer program product recited in claim 45, further comprising: updating the cache based upon the searching the overflow array for the object sub-typing data structure.

47. Computer program product recited in claim 31, further comprising:

computer code for associating the object sub-typing data structure to the input object if the object sub-type is found in the searching only the cache for the object sub-typing data structure corresponding to the input object type.

48. Computer program product recited in claim 31 wherein the cache is updated by adding the object sub-typing data structure found in the searching of the overflow array.

49. Computer program product recited in claim 31, wherein the cache is updated by deleting an object sub-typing data structure, the cache being further updated by adding the object sub-typing data structure found in the searching of the overflow array.

* * * * *